(12) United States Patent
Naga et al.

(10) Patent No.: US 6,281,302 B1
(45) Date of Patent: Aug. 28, 2001

(54) SOLID CATALYST COMPONENT, CATALYST FOR OLEFIN POLYMERIZATION, AND METHOD FOR PRODUCING OLEFIN POLYMER

(75) Inventors: Naofumi Naga, Yokohama; Kotohiro Nomura, Ikoma; Tatsuya Miyatake, Ichihara, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/106,285

(22) Filed: Jun. 29, 1998

(30) Foreign Application Priority Data

Jul. 3, 1997 (JP) .................................................. 9-178239
Mar. 25, 1998 (JP) ................................................ 10-077652

(51) Int. Cl.⁷ .............................. C08F 4/32; C08F 4/614; C08F 10/00
(52) U.S. Cl. .................................. 526/124.3; 526/124.2; 526/116; 526/101; 526/125; 526/346; 502/151; 502/152; 502/153; 502/156
(58) Field of Search .............................. 526/116, 124.2, 526/124.3, 101, 125, 346; 502/156, 151, 152, 153

(56) References Cited

U.S. PATENT DOCUMENTS

| 4,693,990 | 9/1987 | Hiroyuki et al. | |
| 5,387,664 | * 2/1995 | Kawasaki et al. | 526/336 |
| 5,409,875 | * 4/1995 | Hsu et al. | 502/109 |

FOREIGN PATENT DOCUMENTS

| 0208524 | 1/1987 | (EP) . |
| 0767184 | 4/1997 | (EP) . |
| 8198909 | 8/1996 | (JP) . |
| 9630122 | 10/1996 | (WO) . |

* cited by examiner

Primary Examiner—Nathan M. Nutter
Assistant Examiner—Olga Asinovsky
(74) Attorney, Agent, or Firm—Stevens, Davis, Miller & Mosher, L.L.P.

(57) ABSTRACT

A solid catalyst component for olefin polymerization prepared by a method which comprises contacting the following components (a), (b), (c) and (d):

(a) a polymer carrier containing a carbonyl group;
(b) an organometallic compound of metal of Group I, II or XIII of the Periodic Table;
(c) a transition metal compound of Group IV of the Periodic Table; and
(d) a phenol compound, a catalyst for olefin-polymerization comprising said solid catalyst component and an organoaluminum compound and/or organoaluminum oxide compound, and a method for producing an olefin polymer with said catalyst.

13 Claims, 1 Drawing Sheet

SOLID CATALYST COMPONENT, CATALYST FOR OLEFIN POLYMERIZATION, AND METHOD FOR PRODUCING OLEFIN POLYMER

BACKGROUND OF THE INVENTION

1. Field of the Invention

The present invention relates to a solid catalyst component for olefin polymerization, a catalyst for olefin polymerization, and a method for producing an olefin polymer. More particularly, the present invention relates to a solid catalyst component for olefin polymerization which can exhibit a high activity in polymerization of an olefin, a catalyst for olefin polymerization having a high activity using the same, and a method for producing efficiently an olefin homopolymer and copolymer using the same.

2. Description of the Related Art

As a catalyst for olefin polymerization, a Ziegler-Natta catalyst comprising a transition metal component and an organometallic component, is conventionally known. For example, as a catalyst exhibiting a high activity in olefin polymerization, there have been proposed various catalysts comprising a solid catalyst component made from a titanium compound and a magnesium compound, and an organoaluminum compound. However, when polymerization of an α-olefin such as propylene or the like, or copolymerization of ethylene with an α-olefin is conducted with the catalyst, there is a problem that low molecular weight polymers and low crystalline polymers are formed in large amount. The low molecular weight polymers and low crystalline polymers are components which exert reverse influence on transparency, impact resistance, blocking property and the like when the resulted olefin polymer is processed into a film and a sheet, therefore, it is desired to produce an olefin polymer containing little low molecular weight polymers and low crystalline polymers.

Regarding such catalysts, as a method for reducing low molecular weight polymers and low crystalline polymers, there is proposed a method in which stereoregularity is improved by allowing an electron donor such as an ester, ether or the like to be contained as an inner donor in a solid catalyst component, in the case of polymerization of an α-olefin such as propylene or the like. There is also a method proposed, for improving stereoregularity by using a catalyst comprising an electron donor such as an ester, ether, amine, organosilicon compound and or like as an outer donor, in addition to the above-described solid catalyst component and organoaluminum compound.

Further, also in the case of the copolymerization of ethylene with an α-olefin, there is proposed a method in which low molecular weight polymers and low crystalline polymers are reduced by using an electron donor as an inner donor and/or an outer donor.

However, in the method in which an electron donor is used as an inner donor and/or an outer donor, when polymerization of an α-olefin such as propylene or the like and copolymerization of ethylene with an α-olefin are conducted, reduction in formation of low molecular weight polymers and low crystalline polymers is not necessarily satisfactory.

Recently, in the field of catalysts for olefin polymerization, there is disclosed, as a new catalyst, a solid catalyst component for olefin polymerization obtained by fixing a magnesium compound and a titanium compound on a carrier composed of a polymer having a functional group.

For example, WO 94/20545 and U.S. Pat. No. 5,409,875 disclose a method for producing an ethylene-based polymer by using a catalyst comprising an organoaluminum compound and a solid catalyst component prepared by contacting an ethylene/unsaturated carboxylic acid copolymer carrier with an organomagnesium compound and a transition metal compound. Further, WO 96/30122 discloses a method for producing an ethylene-based polymer by using a catalyst comprising an organometallic compound and a solid catalyst component prepared by contacting an olefin/unsaturated carboxy acid ester copolymer carrier having specific form with an organometallic compound and a transition metal compound.

These catalysts are described to exhibit a high activity in polymerization of an olefin, especially in copolymerization of ethylene with an α-olefin. However, the ethylene/α-olefin copolymer obtained by using these catalysts was insufficient in reduction of low molecular weight and/or low crystalline components.

SUMMARY OF THE INVENTION

An object of the present invention is to provide a solid catalyst component for olefin polymerization which exhibits a high activity and can produce an olefin polymer containing low molecular weight polymers and/or low crystalline polymers produced in very little amount which is expressed by the amount of polymers soluble in xylene at 20° C. (CXS), by using an organometallic compound together with the catalyst in polymerization of an olefin, a catalyst for olefin polymerization having a high activity, comprising the same, and a method for producing an olefin polymer (particularly, an ethylene/α-olefin copolymer) containing low molecular weight polymers and/or low crystalline polymers produced in very little amount of polymers soluble in xylene at 20° C. (CXS), with said catalyst.

The present invention relates to a solid catalyst component for olefin polymerization prepared by contacting the following components (a), (b), (c) and (d), a catalyst for olefin polymerization comprising said solid catalyst component and an organoaluminum and/or organoaluminumoxy compound for olefin-polymerization, and a method for producing an olefin polymer with said solid catalyst for olefin polymerization:

(a) a polymer carrier having a carbonyl group, (b) an organometallic compound of metal of I, II or XIII Group of the Periodic Table, (c) a compound of transition metal of IV Group of the Periodic Table, and (d) a phenol compound.

Figure 1:
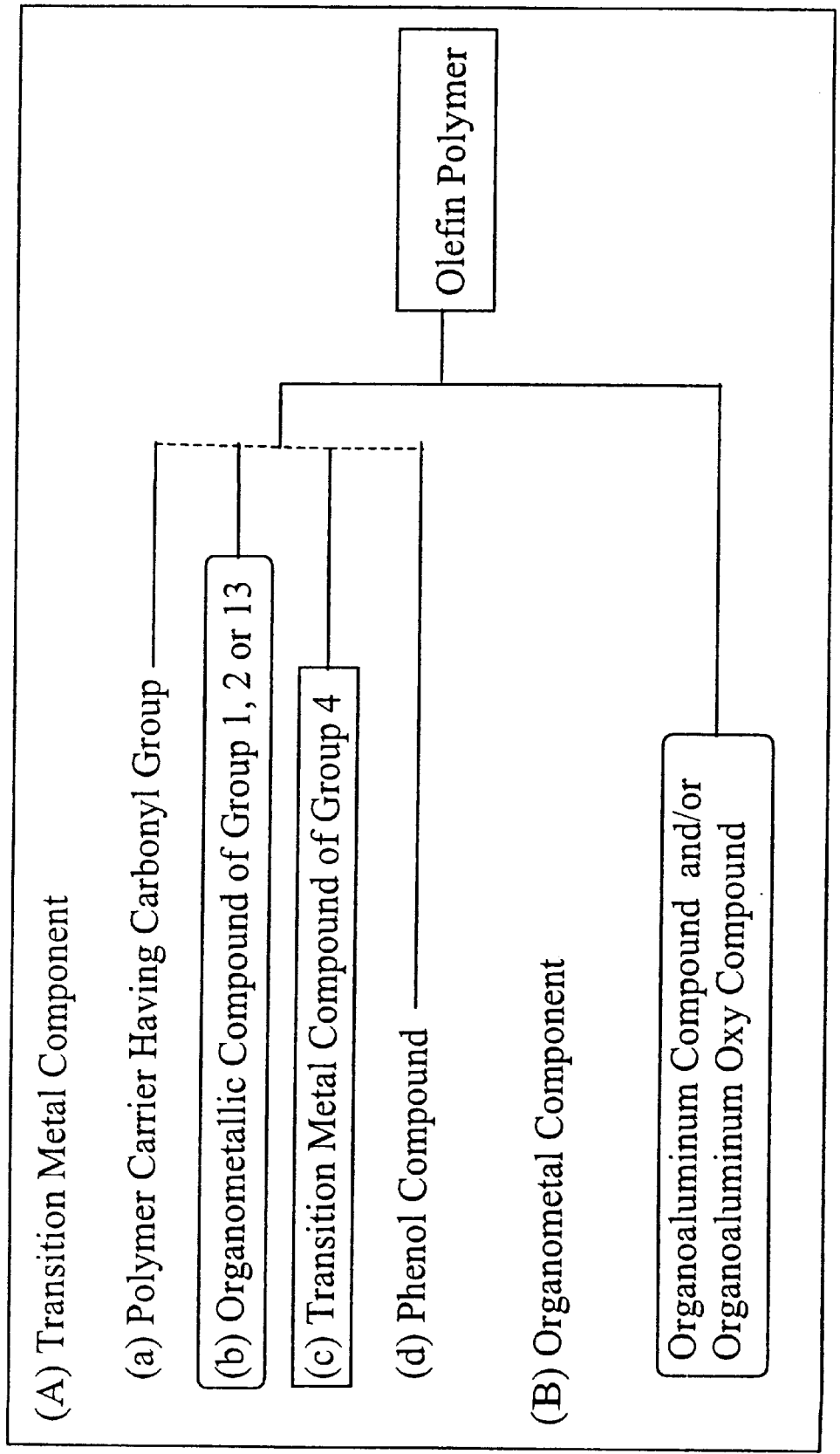
FIG. 1 a flow chart assisting understanding of the present invention.

This flow chart is a typical example of the embodiment of the present invention, and the present invention is not limited thereto.

The present invention will be explained in detail below.

DETAILED DESCRIPTION OF THE INVENTION (a) Polymer Carrier Having Carbonyl Group The polymer carried used in the present invention is a carrier of polymer having a carbonyl group. The carbonyl group may be various groups constituting ones such as a ketone, aldehyde or the like, and preferably is a carboxyl group or a group obtained by esterifying the carboxyl group, and more preferably is a carboxyl group. The polymer having the carbonyl group is preferably a copolymer containing an unsaturated monomer unit having a carbonyl group, or a polymer having a carbonyl group introduced by chemical or physical modification.

Example of the unsaturated monomer having a carbonyl group include unsaturated carboxylic acids, unsaturated carboxylic acid esters, vinyl carboxylates and the like, and specifically, include acrylic acid, methacrylic acid, methyl acrylate, ethyl acrylate, iso-propyl acrylate, n-butyl acrylate, tert-butyl acrylate, neo-pentyl acrylate, n-hexyl acrylate, cyclohexyl acrylate, benzyl acrylate, phenyl acrylate, 2-ethylhexyl acrylate, 2-phenylethyl acrylate, methyl methacrylate, ethyl methacrylate, propyl methacrylate, n-butyl methacrylate, sec-butyl methacrylate, n-pentyl methacrylate, n-hexyl methacrylate, vinyl acetate, vinyl propionate, vinyl butyrate, vinyl pentanoate, vinyl hexanoate and the like, and among them, acrylic acid, methacrylic acid, methyl acrylate, ethyl acrylate, methyl methacrylate and vinyl acetate are preferred.

The copolymer containing an unsaturated monomer unit having a carbonyl group is preferably a copolymer of a unsaturated monomer having a carbonyl group with ethylene, propylene or styrene, and specific examples thereof include an ethylene/acrylic acid copolymer, ethylene/methacrylic acid copolymer, ethylene/methyl acrylate copolymer, ethylene/ethyl acrylate copolymer, ethylene/methyl methacrylate copolymer, ethylene/vinyl acetate copolymer, propylene/acrylic acid copolymer, propylene/methacrylic acid copolymer, propylene/methyl acrylate copolymer, propylene/ethyl acrylate copolymer, propylene/methyl methacrylate copolymer, propylene/vinyl acetate copolymer, styrene/acrylic acid copolymer, styrene/methacrylic acid copolymer, styrene/methyl acrylate copolymer, styrene/ethyl acrylate copolymer, styrene/methyl methacrylate copolymer, styrene/vinyl acetate copolymer and the like.

Among them, a copolymer containing an ethylene unit, propylene unit or styrene unit as a main component is preferable. More preferable is a copolymer containing 49.9 to 0.1% by weight, particularly preferably 30 to 1% by weight of a unsaturated monomer unit having a carbonyl group, and 50.1 to 99.9% by weight, particularly preferably 70 to 99% by weight of an ethylene unit, propylene unit or styrene unit.

Among them, preferable copolymer is a copolymer containing 20 to 5% by weight of an acrylic acid unit, methacrylic acid unit, methyl acrylate unit, ethyl acrylate unit, methyl methacrylate unit or vinyl acetate unit as the unsaturated monomer unit, and 80 to 95% by weight of an ethylene unit. Herein, the total of the ethylene, propylene or styrene unit and the unsaturated monomer unit is 100% by weight.

As a method for introducing a carbonyl group by chemical or physical modification of a polymer, any known method may be adopted. As the polymer used in this method, preferable are polymers containing an ethylene unit, propylene unit or styrene unit. More preferable are homopolymers of ethylene, propylene or styrene, and copolymers containing an ethylene unit, propylene unit or styrene unit as a main unit, and further preferable are copolymers containing 50.1 to 100% by weight of an ethylene unit, propylene unit or styrene unit and 49.9 to 0% by weight of an α-olefin. Specific examples thereof include polyethylene, ethylene/α-olefin copolymer, polypropylene, propylene/ethylene copolymer, propylene/butene-1 copolymer, polystyrene and the like.

As the method for introducing a carbonyl group by chemical or physical modification of a polymer, there can be exemplified a method in which a polymer containing a halogenated styrene unit (e.g. a styrene/bromostyrene copolymer) is treated with an organo alkaline metal compound (e.g. nBuLi), then, reacted with carbon monooxide, to obtain e.g. a styrene/carboxylstyrene copolymer, a method in which an polyolefin (e.g. polypropylene) and a unsaturated monomer having a carbonyl group are melted and kneaded in the presence of an organic peroxide, to obtain, e.g. a maleic anhydride-modified polypropylene, and the like. As the unsaturated monomer having a carbonyl group used in the latter case, the same monomers as described above can be used, and preferably, acrylic acid or maleic anhydride is used. When an acid anhydride (e.g. maleic anhydride) is used, it is suitable to conduct hydrolysis after melt kneading.

Specific examples of the polymer having a carbonyl group introduced by chemical or physical modification include a styrene/carboxylstyrene copolymer, acrylic acid-modified polyethylene, acrylic acid-modified polypropylene, acrylic acid-modified polystyrene, maleic anhydride-modified polyethylene, maleic anhydride-modified polypropylene, maleic anhydride-modified polystyrene, and hydrolyzate of maleic anhydride-modified polyethylene, maleic anhydride-modified polypropylene or maleic anhydride-modified polystyrene, and the like.

As the polymer having a carbonyl group, a copolymer containing a unsaturated monomer unit having a carbonyl group is more preferable.

These polymer carriers may be used alone or in admixture of two or more. Further, the carrier may be used in admixture with other polymer within the range which does not lose essential properties.

The particle diameter of the polymer carrier is preferably 1 to 500 µm, more preferably 5 to 300 µm, most preferably 20 to 200 µm.

(b) Organometallic Compound

The organometallic compound used in the present invention is an organometallic compound of metal of I, II or XIII Group of the Periodic Table of Elements. As the metal of I Group of the Periodic table, lithium, sodium, potassium and the like are listed. As the organometallic compound thereof, hydrocarbyllithium, hydrocarbylsodium, hydrocarbylpotassium and the like are listed, hydrocarbyllithium being preferable, and specific examples thereof include methyllithium, ethyl lithium, butyllithium and the like.

As the metal of II Group, magnesium, calcium and the like are listed, and as the organometallic compound thereof, dihydrocarbylmagnesium, hydrocarbyl magnesium halide, dihydrocarbylcalcium and the like are listed.

The dihydrocarbylmagnesium is generally represented by the general formula: $R^1R^2Mg$ (wherein, $R^1$ and $R^2$ represent a hydrocarbon group having 1 to 20 carbon atoms, and $R^1$ and $R^2$ may be the same or different.). As the groups $R^1$ and $R^2$, an alkyl group, aryl group, aralkyl group or alkenyl group having up to 20 carbon atoms is preferred, and specific examples thereof include methyl group, ethyl group, n-propyl group, iso-propyl group, n-butyl group, sec-butyl group, tert-butyl group, iso-amyl group, hexyl group, octyl group, 2-ethylhexyl group, phenyl group, benzyl group, allyl group and the like. Among these compounds represented by the general formula: $R^1R^2Mg$, diethylmagnesium, n-butylethylmagnesium and di-n-butylmagnesium are suitably used. These dihydrocarbylmagnesium may be used as a mixture with a trialkylaluminium.

The hydrocarbyl magnesium halide is generally called Grignard reagent, and usually represented by the general formula R³MgY (wherein, R³ represents a hydrocarbon group having 1 to 20 carbon atoms, and Y represents a halogen atom.). R³ has the same definitions as R¹ and R², and examples of the halogen atom include a fluorine atom, chlorine atom, bromine atom, and iodine atom, and preferably, a chlorine atom or bromine atom. Specific examples of the hydrocarbyl magnesium include methylmagnesium chloride, methylmagnesium bromide, methylmagnesium iodide, ethylmagnesium chloride, ethylmagnesium bromide, n-butylmagnesium chloride, n-butylmagnesium bromide, cyclohexylmagnesium chloride, allylmagnesium chloride, phenylmagnesium chloride, phenylmagnesium bromide, benzylmagnesium chloride and the like, and preferably, methylmagnesium chloride, methylmagnesium bromide, n-butylmagnesium chloride, n-butylmagnesium bromide or phenylmagnesium chloride.

As the metal of XIII Group of the Periodic Table, aluminum, gallium and the like are listed, and as the organometallic compound thereof, an organoaluminum, organoaluminum halide, organoaluminum hydride and the like are listed. As the organoaluminum, trimethylaluminum, triethylaluminum, triisobutylaluminum and the like are listed, and as the organoaluminum halide, dimethylaluminum chloride, dimethylaluminum bromide, diethylaluminum chloride, diisobutylaluminum chloride, methylaluminum dichloride, ethylaluminum dichloride, isobutylaluminum dichloride, ethylaluminum sesquichloride and the like are listed, and as the organoaluminum halide, diethylaluminum hydride, diisobutylaluminum hydride and the like are listed.

As the organometallic compound of metal of I, II or XIII Group of the Periodic Table, organometallic compounds of the Group 1 or 2 are preferable, more preferable are organomagnesium compounds. Dihydrocarbylmagnesiums are particularly preferable.

(c) Transition Metal Compound

As transition metal compounds of Group IV of the Periodic Table used in the present invention, a titanium compound, zirconium compound and hafnium compound are listed, and a titanium compound is preferable. More preferable is a titanium compound represented by the general formula Ti(OR)$_n$X$_{4-n}$ (wherein, R represents an alkyl group having 1 to 4 carbon atoms, X represents a chlorine atom, bromine atom or iodine atom, and n represents zero or an integer from 1 to 4).

Specific examples of the titanium compound represented by the general formula above include titanium tetrahalides (e.g. titanium tetrachloride, titanium tetrabromide, titanium tetraiodide); alkoxytitanium trihalides (e.g. methoxytitanium trichloride, ethoxytitanium trichloride, butoxytitanium trichloride, phenoxytitanium trichloride, ethoxytitanium tribromide); dihalogenated dialkoxytitanium dihalides (e.g. dimethoxytitanium dichloride, diethoxytitanium dichloride, dibutoxytitanium dichloride, diphenoxytitanium dichloride, diethoxytitanium dibromide); monohalogenated trialkoxy titnaium monohalides (e.g. trimethoxytitanium chloride, triethoxytitanium chloride, tributoxytitanium chloride, triphenoxytitanium chloride, triethoxytitanium bromide); tetraalkoxytitanium (e.g. tetramethoxytitanium, tetraethoxytitanium, tetraphenoxytitanium). Preferable are titanium tetrahalides, and particularly preferable is titanium tetrachloride.

(d) Phenol Compound

As the phenol compound used in the present invention, unsubstituted or substituted phenols can be used, and phenol compounds having a substituent at least at 2-position are preferable, and phenol compounds having a substituent at least at 2- and 6-positions are more preferable. As the substituent, there are given halogen atoms, and alkyl, aralkyl, aryl, silyl, alkoxy, aralkyloxy, aryloxy or silyloxy groups, having up to 10 carbon atoms, optionally substituted with a halogen atom.

Specific examples of the phenol compound include 2-substitutedphenols (e.g. 2-methylphenol, 2-ethylphenol, 2-n-butylphenol, 2-iso-butylphenol, 2-t-butylphenol, 2-n-propylphenol, 2-iso-propylphenol, 2-phenylphenol, 2-fluorophenol, 2-chlorophenol, 2-bromophenol); 2,6-substituted phenols (e.g. 2,6-dimethylphenol, 2,6-diethylphenol, 2,6-di-n-butylphenol, 2,6-di-iso-butylphenol, 2,6-di-t-butylphenol, 2,6-di-n-propylphenol, 2,6-di-iso-propylphenol, 2,6-diphenylphenol, 2,6-difluorophenol, 2,6-dichlorophenol, 2,6-dibromophenol); 2,6,X-substituted phenols (X represents one or more numbers selected from 3, 4 and 5)(e.g. 2,4,6-trimethylphenol, 2,6-di-t-butyl-4-methylphenol, pentafluorophenol).

Preferable are 2-methylphenol, 2-ethylphenol, 2-n-butylphenol, 2-iso-butylphenol, 2-t-butylphenol, 2-n-propylphenol, 2-iso-propylphenol, 2-phenylphenol, 2,6-dimethylphenol, 2,6-diethylphenol, 2,6-di-n-butylphenol, 2,6-di-iso-butylphenol, 2,6-di-t-butylphenol, 2,6-di-n-propylphenol, 2,6-di-iso-propylphenol and 2,6-diphenylphenol.

As the phenol compound, more preferable are 2-substituted phenols, 2,6-substituted phenols or 2,6,X-substituted phenols (X is as defined above.) of which substituent is a branched alkyl group, cycloalkyl group or aryl group.

(A) Solid Catalyst Component for Olefin Polymerization

The solid catalyst component for olefin polymerization of the present invention is prepared by contacting the following components (a), (b), (c) and (d) as explained above.

(a) a polymer carrier containing a carbonyl group, (b) an organometallic compound of I, II or XIII group metal of the Periodic table, (c) a compound of transition metal of IV Group of the Periodic Table, and (d) a phenol compound.

As the solvent used in the preparation of the solid catalyst component (A), there are illustrated aliphatic hydrocarbons (e.g. pentane, hexane, heptane, octane, decane), aromatic hydrocarbons (e.g. benzene, toluene, xylene), alicyclic hydrocarbons (e.g. cyclohexane, cyclopentane), halogenated hydrocarbons (e.g. 1,2-dichloroethane, monochlorobenzene), ether compounds (e.g. diethyl ether, dibutyl ether, diisoamyl ether, tetrahydrofuran). Preferable is hexane, heptane, octane, toluene or xylene.

The preparation of the solid catalyst component (A) is preferably conducted under an inert gas atmosphere such as nitrogen, argon or the like. The preparation temperature is usually from −30 to 200° C., and preferably from 0 to 150° C., more preferably from 20 to 120° C.

Regarding the ratio of the components in preparing the solid catalyst component (A), the molar ratio of the organometallic compound (b) to the carbonyl group contained in the polymer carrier (a) is from 0.1 to 100 times, preferably from 0.1 to 10 times. The molar ratio of the transition metal compound (c) to the organometallic compound (b) is from 0.1 to 100 times, preferably from 0.1 to 10 times. The molar ratio of the phenol compound (d) to the transition metal compound (c) fixed on the carrier is from 0.1 to 100 times, preferably from 0.1 to 10 times.

The order for adding the components is not particularly restricted, and the components may be added sequentially or some components may be previously mixed before the addition, and preferably, the components (a), (b), (c) and (d) are added in this order. After the components are added and reacted, they are preferably washed with a solvent used for the preparation.

The preparation time is not particularly restricted, and it is suitable that the reaction time in each step is usually from 5 minutes to 24 hours.

The solid catalyst component (A) prepared is preferably stored in cool and dark place under an inert gas atmosphere such as nitrogen, argon or the like.

(B) Organoaluminum Compound and/or Organoaluminumoxy Compound

The catalyst for olefin polymerization of the present invention comrises the above-described solid catalyst component (A) for olefin polymerization and the organoaluminum compound and/or organoaluminumoxy compound (B).

The organoaluminum compound used in the present invention has at least one Al—C bond in its molecule, and for example, is a compound represented by the general formula $R^4{}_nAlZ_{3-n}$ (wherein, $R^4$ represents an alkyl group having 1 to 10 carbon atoms, Z represents a halogen atom or hydrogen atom, and n is a number satisfying $0<n\leq3$.). Specific examples of the organoaluminum compound include trimethylaluminum, triethylaluminum, tri-n-propylaluminum, tri-n-butylaluminum, triisobutylaluminum, tri-tert-butylaluminum, triisopropylaluminum, tripentylaluminum, tri-n-hexylaluminum, tri(2-methylpentyl)aluminum, tri-n-octylaluminum, diethylaluminum hydride, diisobutylaluminum hydride, methylaluminum sesquichloride, ethylaluminum sesquichloride, isobutylaluminum sesquichloride, dimethylaluminum chloride, diethylaluminum chloride, di-n-propylaluminum chloride, di-n-butylaluminum chloride, diisobutylaluminum chloride, di-tert-butylaluminum chloride, diisopropylaluminum chloride, dipentylaluminum chloride, methylaluminum dichloride, ethylaluminum dichloride, isobutylaluminum dichloride, tert-butylaluminum dichloride, isopropylaluminum dichloride, pentylaluminum dichloride and the like. Among these, diethylaluminum chloride, triethylaluminum and triisobutylaluminum are suitably used.

As the organoaluminumoxy compound (aluminoxane), known compounds can be used, and for example, those obtained by reaction of one kind of trialkylaluminum with water and those obtained by reaction of a mixture of two or more kinds of trialkylaluminums with water, or the like are used. Specifically, methylaluminoxane, ethylaluminoxane, propylaluminoxane, butylaluminoxane, isobutylaluminoxane, methylethylaluminoxane, methylbutylaluminoxane, methylisobutylaluminoxane and the like are exemplified. Paticularly, methylaluminoxane, isobutylaluminoxane or methylisobutylaluminoxane is suitably used.

[Preparation of olefin polymer]

As a method for supplying the catalyst components to a polymerization vessel when an olefin polymer is produced in the present invention, for example, there is illustrated a method in which the catalyst components are supplied under the condition of moisture free in an inert gas such as nitrogen, argon or the like, in the presence of an olefin monomer. The solid catalyst component for olefin polymerization (A), and the organoaluminum compound and/or organoaluminumoxy compound (B) may be supplied separately or previously contacted before the supply.

The amount used of the organoaluminum compound and/or organoaluminumoxy compound (B) can be usually selected in wide range such as 1 to 10000 moles in terms of molar amount of an aluminum atom per one mole of a transition metal atom in the solid catalyst component for olefin polymerization (A). It is preferably within therange from 1 to 3000 moles per one of a transition metal atom.

In producing an olefin polymer in the present invention, a known electron donor may coexist as an outer donor. As the electron donor, an organic compound having an Si—OR bond (wherein, R represents a hydrocarbon atom having 1 to 20 carbon atoms.) can be preferably used.

Specific examples of the organic compound having a Si—OR bond include tetramethoxysilane, dimethyldimethoxysilane, tetraethoxysilane, triethoxysilane, diethoxysdiethylsilane, ethoxytriethylsilane, tetra-iso-propoxysilane, di-iso-propoxy-di-iso-propylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, poly(dimethylsiloxane), poly (diphenylsiloxane), poly(methylhydrosiloxane), poly (phenylhydrosiloxane) and the like.

The solid catalyst component for olefin polymerization of the present invention may be used after an olefin is prepolymerized. The prepolymerization is conducted, for example, by contacting the solid catalyst component with the above-described aluminum compound and the olefin. As the olefin, ethylene, propylene, butene-1 and the like are listed. The prepolymerization can be conducted by homopolymerization or copolymerization.

In prepolymerizing the olefin with the solid catalyst component for olefin polymerization of the present invention, it is also preferable to make the solid catalyst component for olefin polymerization into a slurry, and as the solvent used in this procedure, aliphatic hydrocarbons such as butane, pentane, hexane, heptane and the like, aromatic hydrocarbons such as toluene, xylene and the like, are listed.

Further, in the prepolymerization, the preferable amount of the organoaluminum compound is 0.1 to 100, particularly 1 to 10 times in terms of molar amount of an aluminum atom per one mole of a transition metal atom in the solid catalyst component for olefin polymerization.

The prepolymerization temperature is preferably from –30 to 80° C., particularly from –10 to 50°0 C.

The prepolymerization amount is preferably from 0.1 to 100 g, particularly from 0.5 to 50 g per 1 g of the solid catalyst component for olefin polymerization.

In the present invention, the solid catalyst component for olefin polymerization (A) is subjected to the production of an olefin polymer after the prepolymerization described above or without using prepolymerization together with the organoaluminum compound and/or organoaluminumoxy compound (B).

In the present invention, as the olefins used for polymerization, any of olefins, diolefins and the like having 2 to 20 carbon atoms can be used, and also, two or more kinds of olefins can be used at simultaneously. Specific examples thereof include, but are not limited to, ethylene, and α-olefins having 3 to 20 carbon atoms (e.g. propylene, butene-1, pentene-1, hexene-1, heptene-1, octene-1, nonene-1, decene-1, 5-methyl-2-pentene-1, vinylcyclohexene). The specific examples of the olefins constituting a copolymer composed of two or more kinds of the olefins include, but are not limited to, ethylene and propylene, ethylene and butene-1, ethylene and hexene-1, ethylene and octene-1, propylene and butene-1, and the like.

The olefin copolymer which can be produced in the present invention is preferably an ethylene/(α-olefin having 3 to 20 carbon atoms) copolymer, and particularly preferably an ethylene/propylene copolymer, ethylene/butene-1 copolymer, ethylene/hexene-1 copolymer or ethylene/octene-1 copolymer.

Further, in the present invention, a chain transfer agent such as hydrogen and the like can also be added for controlling the molecular weight of the olefin copolymer.

The polymerization temperature is usually in the range from −30 to 300° C., and preferably from 20 to 250° C., more preferably from 20 to 100° C. which is low the temperature at which the polymer is melted.

The polymerization pressure is not limited, however, preferably from normal pressure to 150 atms in view of industrial and economical points. The polymerization time is generally determined appropriately depending on the kind of a polymer intended and a reaction apparatus, and usually can be in the range from 5 minutes to 40 hours.

As the polymerization method, any of a continuous method and batch-wise method can be applied. Further, slurry polymerization or solvent polymerization using an inert hydrocarbon solvent (e.g. propane, pentane, hexane, heptane, octane), liquid phase polymerization using no solvent (bulk polymerization ) or gas phase polymerization can also be applied.

EXAMPLE

The present invention will be explained in more detail with the following examples but is not limited thereto.

Items in the examples were measured by the following methods.

(1) Ti Content in Catalyst Component

It was measured by an ICP emission analysis using Optima 3000 manufactured by Perkin Elmer Corp.

(2) α-olefin Content

Specific absorption data of ethylene and an α-olefin were measured using an infrared spectrometer (IR-810 manufactured by JASCO Corporation), and expressed as short chain branch (SCB) per 1000 carbon atoms.

(3) Melt Flow Rate (MFR)

It was measured at 190° C. according to ASTM D1238.

(4) Melt Flow Rate Ratio (MFRR)

MFRR was expressed as ratio of melt flow rate (MFR) measured with the load changed to 21.60 kg to melt flow rate measured at 190° C. according to ASTM D1238.

MFRR=(flow rate under a load of 21.60 kg)÷(flow rate under a load of 2.160 kg)

(5) Low Molecular Weight and Low Crystalline Component

It was evaluated by the content (% by weight) of xylene-soluble fraction at 20° C. in the produced polymer.

Example 1

(1) Preparation of Catalyst

Into a 500 ml round bottom flask equipped with a stirrer, which had been fully replaced with a nitrogen gas were introduced 10 g of an ethylene/acrylic acid copolymer (trade name: Yukaron, acrylic acid content: 7.0% by weight, average particle size: 10 μm, manufactured by Mitsubishi Chemical Corp.) and 200 ml of n-heptane. To this was added dropwise a solution prepared by dissolving 40 mmol of n-butylethylmagnesium into 50 ml of n-heptane, and the resulted mixture was stirred for 2 hours at 40° C. After reaction, the reaction mixture was filtered to obtain a solid product, and then the solid product was washed with 200 ml of n-heptane twice. Then, 200 ml of toluene was introduced, and a solution composed of 11 ml of titanium tetrachloride and 90 ml of toluene was added dropwise, and the resulted mixture was further stirred for 1 hour at room temperature. After reaction, the reaction mixture was filtered to obtain a treated-solid, and the treated-solid was washed with 200 ml of toluene once and with 200 ml of n-heptane twice, and dried under reduced pressure for 2 hours at room temperature to a catalyst precursor (I). The Ti content in the catalyst precursor (I) was 0.171 mmol/g.

Into a 200 ml round bottom flask equipped with a stirrer which had been fully replaced with a nitrogen gas were introduced 538 mg of the catalyst precursor (I) and 50 ml of n-heptane. To this was added 10 mg of o-cresol, and the resulted mixture was stirred for 2 hours at 40° C. After reaction, the reaction mixture was filtered to obtain a treated-solid, and the treated-solid was washed with 50 ml of n-heptane three times, and dried under reduced pressure for 2 hours at room temperature to obtain a solid catalyst component (1). The Ti content in the solid catalyst component (1) was 0.077 mmol/g.

(2) Copolymerization of Ethylene and Butene-1

A 400 ml stainless pressure reaction tube equipped with a stirrer which had been fully replaced with a nitrogen gas was made into reduced pressure condition, and into this were introduced 23 g of butene-1 and 82 g of n-butane, and the temperature in the system was raised to 70° C. Then, 2 $kg/cm^2$ of hydrogen and 6 $kg/cm^2$ of ethylene were introduced, and the mixture was stirred for a short while until saturated state was obtained. A solution prepared by dissolving 1.0 mmol of triisobutylaluminum into 1.0 ml of n-heptane, and subsequently a liquor prepared by suspending 9.5 mg of the solid catalyst component (1) in 5 ml of n-heptane were fed into the system with argon pressure, and polymerization was initiated. 1 hour later, ethanol was poured into the system to terminate the polymerization, then, the unreacted gas was purged to recover a copolymer. The resulted copolymer was dried at 60° C. for 4 hours under reduced pressure to obtain 4.1 g of an ethylene/butene-1 copolymer. The resulted copolymer had a SCB of 19.1 (/1000C), MFR of 1.02 (g/10 min), MFRR of 29.1 and CXS of 5.0% by weight.

Examples 2

(1) Preparation of Catalyst

The same procedure as in Example 1 (1) was repeated except that 525.4 mg of the catalyst precursor (I) was used and 12.2 mg of 2-isopropylphenol was used instead of o-cresol, to synthesize a catalyst (2). The Ti content in the solid catalyst component(2) was 0.081 mmol/g.

(2) Copolymerization of Ethylene and Butene-1

The same procedure as in Example 1 (2) was repeated except that 8.6 mg of the solid catalyst component (2) was used instead of the catalyst (1), to obtain 2.9 g of an ethylene/butene-1 copolymer. The resulted copolymer had a SCB of 21.3 (/1000C), MFR of 1.55 (g/10 min), MFRR of 29.2 and CXS of 5.8% by weight.

Examples 3

(1) Preparation of Catalyst

The same procedure as in Example 1 (1) was repeated except that 546.1 mg of the catalyst precursor (I) was used and 14.0 mg of 2-tert-butylphenol was used instead of o-cresol, to synthesize a solid catalyst component (3). The Ti content in the solid catalyst component (3) was 0.079 mmol/g.

(2) Copolymerization of Ethylene and Butene-1(1)

The same procedure as in Example 1 (2) was repeated except that 17.3 mg of the solid catalyst component (3) was used instead of the solid catalyst component (1), and 16 g of butene-1 was used, to obtain 8.3 g of an ethylene/butene-1 copolymer. The resulted copolymer had a SCB of 19.2 (/1000C), MFR of 1.39 (g/10 min), MFRR of 28 and CXS of 3.7% by weight.

(3) Copolymerization of Ethylene and Butene-1 (2)

The same procedure as in Example 1 (2) was repeated except that 9.1 mg of the solid catalyst component (3) was used instead of the solid catalyst component (1), and 21 g of butene-1 was used, to obtain 3.9 g of an ethylene/butene-1 copolymer. The resulted copolymer had a SCB of 18.5 (/1000C), MFR of 0.89 (g/10 min), MFRR of 30.6 and CXS of 3.8% by weight.

Examples 4

(1) Preparation of Catalyst

The same procedure as in Example 3 (1) was repeated except that 497.5 mg of the catalyst precursor (I) was used and 12.8 mg of 2-tert-butylphenol was used, to synthesize a solid catalyst component (3'). The Ti content in the solid catalyst component (3') was 0.094 mmol/g.

(2) Copolymerization of Ethylene and Butene-1

The same procedure as in Example 1 (2) was repeated except that 13.8 mg of the solid catalyst component (3') was used instead of the solid catalyst component (1), to obtain 4.7 g of an ethylene/butene-1 copolymer. The resulted copolymer had a SCB of 19.9 (/1000C), MFR of 1.31 (g/10 min), MFRR of 31.0 and CXS of 4.2% by weight.

Examples 5

(1) Preparation of Catalyst

The same procedure as in Example 1 (1) was repeated except that 508.5 mg of the catalyst precursor (I) was used and 10.6 mg of 2,6-dimethylphenol was used instead of o-cresol, to synthesize a solid catalyst component (4). The Ti content in the solid catalyst component (4) was 0.079 mmol/g.

(2) Copolymerization of Ethylene and Butene-1

The same procedure as in Example 1 (2) was repeated except that 9.3 mg of the solid catalyst component (4) was used instead of the solid catalyst component (1), to obtain 3.8 g of an ethylene/butene-1 copolymer. The resulted copolymer had a SCB of 19.7 (/1000C), MFR of 1.01 (g/10 min), MFRR of 28.7 and CXS of 4.4% by weight.

Examples 6

(1) Preparation of Catalyst

The same procedure as in Example 1 (1) was conducted except that 517.0 mg of the catalyst precursor (I) was used and 15.8 mg of 2,6-diisopropylphenol was used instead of o-cresol, to synthesize a solid catalyst component (5). The Ti content in the solid catalyst component (5) was 0.075 mmol/g.

(2) Copolymerization of Ethylene and Butene-1

The same procedure as in Example 1 (2) was repeated except that 16.8 mg of the solid catalyst component (5) was used instead of the solid catalyst component (1), and 19 g of butene-1 was used, to obtain 4.7 g of an ethylene/butene-1 copolymer. The resulted copolymer had a SCB of 17.6 (/1000C), MFR of 1.03 (g/10 min), MFRR of 27.4 and CXS of 4.2% by weight.

(3) Copolymerization of Ethylene and Butene-1

The same procedure as in Example 1 (2) was repeated except that 8.2 mg of the solid catalyst component (5) was used instead of the solid catalyst component (1), and 23 g of butene-1 was used, to obtain 2.4 g of an ethylene/butene-1 copolymer. The resulted copolymer had a SCB of 21.2 (/1000C), MFR of 1.27 (g/10 min), MFRR of 30.5 and CXS of 4.5% by weight.

Examples 7

(1) Preparation of Catalyst

The same procedure as in Example 1 (1) was conducted except that 544.8 mg of the catalyst precursor (I) was used and 19.2 mg of 2,6-di-tert-butylphenol was used instead of o-cresol, to synthesize a solid catalyst component (6). The Ti content in the solid catalyst component (6) was 0.096 mmol/g.

(2) Copolymerization of Ethylene and Butene-1 (1)

The same procedure as in Example 1 (2) was repeated except that 14.9 mg of the solid catalyst component (6) was used instead of the solid catalyst component (1), and 25 g of butene-1 was used, to obtain 4.6 g of an ethylene/butene-1 copolymer. The resulted copolymer had a SCB of 17.9 (/1000C), MFR of 0.57 (g/10 min), MFRR of 32.8 and CXS of 4.2% by weight.

(3) Copolymerization of Ethylene and Butene-1 (2)

The same procedure as in Example 1 (2) was repeated except that 17.0 mg of the catalyst (6) was used instead of the solid catalyst component (1), 23 g of butene-1 was used, and the hydrogen pressure was changed to 1.5 kg/cm$^2$, to obtain 4.8 g of an ethylene/butene-1 copolymer. The resulted copolymer had a SCB of 19.9 (/1000C) and CXS of 5.5% by weight.

Examples 8

(1) Preparation of Catalyst

The same procedure as in Example 1 (1) was repeated except that 508.5 mg of the catalyst precursor (I) was used and 21.4 mg of 2,6-diphenylphenol was used instead of o-cresol, to synthesize a catalyst (7). The Ti content in the catalyst (7) was 0.100 mmol/g.

(2) Copolymerization of Ethylene and Butene-1

The same procedure as in Example 1 (2) was repeated except that 14.0 mg of the solid catalyst component (7) was used instead of the catalyst (1), to obtain 2.9 g of an ethylene/butene-1 copolymer. The resulted copolymer had a SCB of 19.3 (/1000C), MFR of 0.84 (g/10 min), MFRR of 30.2 and CXS of 4.6% by weight.

Example 9

(1) Preparation of Catalyst

The same procedure as in Example 1 (1) was conducted except that 518.2 mg of the catalyst precursor (I) was used and 11.5 mg of 2,6-difluorophenol was used instead of o-cresol, to synthesize a solid catalyst component (8). The Ti content in the solid catalyst component (8) was 0.079 mmol/g.

(2) Copolymerization of Ethylene and Butene-1

The same procedure as in Example 1 (2) was conducted except that 12.0 mg of the solid catalyst component (8) was used instead of the solid catalyst component (1), to obtain 3.5 g of an ethylene/butene-1 copolymer. The resulted copolymer had a SCB of 18.5 (/1000C), MFR of 1.08 (g/10 min), MFRR of 29.7 and CXS of 4.6% by weight.

Example 10

(1) Preparation of Catalyst

The same procedure as in Example 1 (1) was repeated except that 484.7 mg of the catalyst precursor (I) was used and 13.5 mg of 2,6-dichlorophenol was used instead of o-cresol, to synthesize a catalyst (9). The Ti content in the catalyst (9) was 0.102 mmol/g.

(2) Copolymerization of Ethylene and Butene-1

The same procedure as in Example 1 (2) was repeated except that 12.3 mg of the solid catalyst component (9) was used instead of the solid catalyst component (1), to obtain 5.8 g of an ethylene/butene-1 copolymer. The resulted copolymer had a SCB of 18.9 (/1000C), MFR of 0.84 (g/10 min), MFRR of 30.7 and CXS of 4.2% by weight.

(3) Copolymerization of Ethylene and Butene-1

The same procedure as in Example 1 (2) was repeated except that 10.5 mg of the solid catalyst component (9) was used instead of the catalyst (1), and 26 g of butene-1 was used, to obtain 4.4 g of an ethylene/butene-1 copolymer. The resulted copolymer had a SCB of 21.8 (/1000C), MFR of 1.17 (g/10 min), MFRR of 29.2 and CXS of 7.8% by weight.

Example 11

(1) Preparation of Catalyst

The same procedure as in Example 1 (1) was repeated except that 486.4 mg of the catalyst precursor (I) was used and 21.0 mg of 2,6-dibromophenol was used instead of o-cresol, to synthesize a solid catalyst component (10). The Ti content in the solid catalyst component (10) was 0.102 mmol/g.

(2) Copolymerization of Ethylene and Butene-1

The same procedure as in Example 1 (2) was repeated except that 16.4 mg of the solid catalyst component (10) was used instead of the solid catalyst component (1), to obtain 3.9 g of an ethylene/butene-1 copolymer. The resulted copolymer had a SCB of 20.4 (/1000C), MFR of 2.10 (g/10 min), MFRR of 27.9 and CXS of 5.7% by weight.

Example 12

(1) Preparation of Catalyst

The same procedure as in Example 1 (1) was repeated except that 503.5 mg of the catalyst precursor (I) was used and 19.0 mg of 2,6-di-tert-butyl-4-methylphenol was used instead of o-cresol, to synthesize a solid catalyst component (11). The Ti content in the solid catalyst component (11) was 0.121 mmol/g.

(2) Copolymerization of Ethylene and Butene-1

The same procedure as in Example 1 (2) was conducted except that 12.7 mg of the solid catalyst component (11) was used instead of the solid catalyst component (1), and 25 g of 1-butene was used to obtain 2.8 g of an ethylene/butene-1 copolymer. The resulted copolymer had a SCB of 21.6 (/1000C), MFR of 2.25 (g/10 min), MFRR of 31.8 and CXS of 6.6% by weight.

Comparative Examples 1

(1) Copolymerization of Ethylene and Butene-1

The same procedure as in Example 1 (2) was repeated except that 2.2 mg of the catalyst precursor (I) was used instead of the solid catalyst component (1), and 20 g of 1-butene was used to obtain 2.9 g of an ethylene/butene-1 copolymer. The resulted copolymer had a SCB of 16.0 (/1000C), MFR of 0.57 (g/10 min), MFRR of 28.6 and CXS of 2.7% by weight.

Comparative Example 2

(1) Copolymerization of Ethylene/Butene-1 copolymer

The same procedure as in Example 1 (2) was repeated except that 3.8 mg of the catalyst precursor (I) was used instead of the solid catalyst component (1), to obtain 4.3 g of an ethylene/butene-1 copolymer. The resulted copolymer had a SCB of 16.8 (/1000C), MFR of 0.54 (g/10 min), MFRR of 28.7 and CXS of 3.5% by weight.

Comparative Example 3

(1) Copolymerization of Ethylene and Butene-1

The same procedure as in Example 1 (2) was repeated except that 9.2 mg of the catalyst precursor (I) was used instead of the solid catalyst component (1) and 24 g of butene-1 was used to obtain 8.8 g of an ethylene/butene-1 copolymer. The resulted copolymer had a SCB of 20.0 (/1000C), MFR of 1.06 (g/10 min), MFRR of 29.1 and CXS of 7.3% by weight.

Comparative Example 4

(1) Copolymerization of Ethylene and Butene-1

The same procedure as in Example 1 (2) was conducted except that 8.9 mg of the catalyst precursor (I) was used instead of the solid catalyst component (1), to obtain 7.7 g of an ethylene/butene-1 copolymer. The resulted copolymer had a SCB of 21.1 (/1000C), MFR of 1.38 (g/10 min), MFRR of 29.1 and CXS of 7.8% by weight.

Comparative Example 5

(1) Copolymerization of Ethylene and Butene-1

The same procedure as in Example 1 (2) was repeated except that 9.1 mg of the catalyst precursor (I) was used instead of the solid catalyst component (1), and 25 g of butene-1 was used, to obtain 6.5 g of an ethylene/butene-1 copolymer. The resulted copolymer had a SCB of 21.9 (/1000C), MFR of 2.02 (g/10 min), MFRR of 29.2 and CXS of 8.9% by weight.

Comparative Example 6

(1) Copolymerization of Ethylene and Butene-1

The same procedure as in Example 1 (2) was repeated except that 5.5 mg of the previous catalyst (I) was used instead of the catalyst (1), and 26 g of butene-1 was used, to obtain 4.3 g of an ethylene/butene-1 copolymer. The resulted copolymer had a SCB of 23.6 (/1000C), MFR of 1.07 (g/10 min), MFRR of 31.2 and CXS of 10.0% by weight.

Example 13

(1) Copolymerization of Ethylene/Butene-1 Copolymer

The same procedure as in Example 1 was repeated except that 15.3 mg of the solid catalyst component (3') was used instead of the catalyst (1), and 1 mmol of triethylaluminum was used instead of triisobutylaluminum, to obtain 3.9 g of an ethylene/butene-1 copolymer. The resulted copolymer had a SCB of 19.5 (/1000C), MFR of 3.49 (g/10 min), MFRR of 31.9 and CXS of 6.0% by weight.

Examples 14

(1) Copolymerization of Ethylene and Butene-1

The same procedure as in Example 1 was repeated except that 15.3 mg of the solid catalyst component (3') was used instead of the solid catalyst component (1), and 1 mmol of diethylaluminum chloride was used instead of triisobutylaluminum, to obtain 12.5 g of an ethylene/butene-1 copolymer. The resulted copolymer had a SCB of 31.0 (/1000C), MFR of 0.30 (g/10 min), MFRR of 26.6 and CXS of 7.1% by weight.

According to the present invention, there are provided a solid catalyst component for olefin polymerization which exhibits high activity and can produce an olefin polymer containing low molecular weight polymers and/or low crystalline polymers produced in very little amount which is expressed by the amount of xylene-soluble fraction at 20° C. (CXS), by using an organometallic compound together with the solid catalyst component in polymerization of an olefin, a catalyst for olefin polymerization comprising the same, and a method for producing an olefin polymer (particularly, an ethylene/α-olefin copolymer) containing the low molecular weight polymer and/or low crystalline polymer produced in very small amount.

What is claimed is:

1. A solid catalyst component for olefin-polymerization prepared by amethod which comprises contacting the following components (a), (b), (c) and (d):

(a) a polymer carrier containing a carbonyl group;

(b) an organometallic compound of metal of Group I, II or XIII of the Periodic Table;

(c) a transition metal compound of Group IV of the Periodic Table; and (d) a phenol compound, wherein the olefin-polymerization is a homopolymerization of an olefin having 2–20 carbon atoms, or a copolymerization of two or more olefins selected from olefins having 2–20 carbon atoms.

2. The solid catalyst component according to claim 1, wherein the phenol compound (d) is a phenol compound having a substituent at least at 2-position.

3. The solid catalyst component according to claim 2, wherein the phenol compound (d) is a phenol compound having substituents at least at 2- and 6-positions.

4. The solid catalyst component according to claim 1 wherein the polymer carrier containing a carbonyl group (a) is a copolymer containing an unsaturated monomer unit having a carbonyl group, or a polymer having a carbonyl group introduced by chemical or physical modification.

5. The solid catalyst component according to claim 4, wherein the polymer carrier having a carbonyl group (a) is the copolymer of the unsaturated monomer having a carbonyl group with ethylene, propylene or styrene.

6. The solid catalyst component according to claim 1, wherein the carbonyl group is a carboxyl group or a group obtained by esterifying a carboxyl group.

7. The solid catalyst component according to claim 1, wherein the organometallic compound of Group I, II or XIII of the Periodic Table (b) is an organomagnesium compound.

8. The solid catalyst component according to claim 1, wherein the transition metal compound of Group IV of the Periodic Table (c) is a titanium compound represented by the general formula: $Ti(OR)_nX_{4-n}$ (wherein, R represents an alkyl group having 1 to 4 carbon atoms, X represents a chlorine atom, bromine atom or iodine atom, and n represents zero or an integer from 1 to 4.).

9. A catalyst for olefin polymerization comprising (A) the solid catalyst component for olefin-polymerization of claim 1 and (B) an organoaluminum compound and/or organoaluminumoxy compound.

10. A method for producing an olefin polymer which comprises polymerizing an olefin with the catalyst of claim 9.

11. The method for producing an olefin polymer according to claim 10, wherein the olefin polymer is a copolymer of ethylene with an α-olefin.

12. The solid catalyst component according to claim 2, wherein the organometallic compound of Group I, II or XIII of the Periodic Table (b) is an organomagnesium compound.

13. The solid catalyst component according to claim 3, wherein the organometallic compound of Group I, II or XIII of the Periodic Table (b) is an organomagnesium compound.

* * * * *